United States Patent
Silvola (10) Patent No.: US 10,097,468 B2
(45) Date of Patent: Oct. 9, 2018

(54) METHOD AND A SYSTEM FOR FINDING SMALLEST HOP-SPECIFIC DATA TRANSFER SPEED

(71) Applicant: TELLABS OY, Espoo (FI)

(72) Inventor: Mika Silvola, Kempele (FI)

(73) Assignee: CORIANT OY, Espoo (FI)

( * ) Notice: Subject to any disclaimer, the term of this patent is extended or adjusted under 35 U.S.C. 154(b) by 154 days.

(21) Appl. No.: 13/928,768

(22) Filed: Jun. 27, 2013

(65) Prior Publication Data
US 2014/0003235 A1    Jan. 2, 2014

(30) Foreign Application Priority Data

Jun. 29, 2012   (FI) .................................... 20125760

(51) Int. Cl.
*H04L 12/801* (2013.01)
*H04L 12/815* (2013.01)
*H04L 12/26* (2006.01)

(52) U.S. Cl.
CPC .......... *H04L 47/18* (2013.01); *H04L 43/0811* (2013.01); *H04L 43/0829* (2013.01); *H04L 43/10* (2013.01); *H04L 47/22* (2013.01)

(58) Field of Classification Search
CPC . H04L 47/18; H04L 43/0811; H04L 43/0829; H04L 43/10; H04L 47/22
See application file for complete search history.

(56) References Cited

U.S. PATENT DOCUMENTS

| 5,367,517 A | * | 11/1994 | Cidon et al. ................... 370/431 |
| 2005/0157646 A1 | | 7/2005 | Addagatla et al. |
| 2006/0099956 A1 | * | 5/2006 | Harada et al. ............. 455/452.2 |

(Continued)

FOREIGN PATENT DOCUMENTS

| EP | 2 579 518 A1 | 4/2013 |
| WO | 2007/113645 | 10/2007 |

(Continued)

OTHER PUBLICATIONS

Extended European Search Report dated Oct. 21, 2013; Application No. 13171954.4.

(Continued)

*Primary Examiner* — Christopher Crutchfield
*Assistant Examiner* — Tito Pham
(74) *Attorney, Agent, or Firm* — Young & Thompson (57) ABSTRACT

A system using the Ethernet OAM functionality for finding the smallest of hop-specific data transfer speeds related to a data transfer path from a first network element (101) to a second network element (102) is presented. The first network element is configured to transmit, to the second network element, first data including an Ethernet OAM message. Each intermediate network element (104, 105) located on the data transfer path is configured to update the first data to indicate so far smallest of the hop-specific data transfer speeds when the first data passes through the intermediate network elements. After receiving the first data, the second network element transmits, to the first network element, second data indicating the smallest of the hop-specific data transfer speeds. Thus, the first network element can be made aware of capacity changes taking place on the data transfer path.

9 Claims, 3 Drawing Sheets

(56) References Cited

U.S. PATENT DOCUMENTS

| | | | |
|---|---|---|---|
| 2008/0095181 A1* | 4/2008 | Suetsugu | H04L 45/00 370/412 |
| 2009/0296670 A1 | 12/2009 | Luo et al. | |
| 2010/0284423 A1* | 11/2010 | Yokotani et al. | 370/468 |
| 2012/0063325 A1* | 3/2012 | Zhao et al. | 370/241.1 |
| 2012/0076029 A1 | 3/2012 | Mohan | |
| 2012/0300637 A1* | 11/2012 | Sabetto et al. | 370/236 |
| 2013/0033985 A1 | 2/2013 | Nakagawa et al. | |

FOREIGN PATENT DOCUMENTS

| | | |
|---|---|---|
| WO | 2011/129363 | 10/2011 |
| WO | 2011/148748 A1 | 12/2011 |

OTHER PUBLICATIONS

Pejhan, S. et al.: Refinements to rate-based flow control with extensions to, multidrop applications, Broadband Communications. Global 20-23 Infrastructure for the Information Age, Proceedings of the International IFIP-IEEE Conference on Broadband Communications, Canada, 1996, Apr. 23, 1996 , pp. 147-160 abstract, chapters 2.1, 2.3, 3 (two first paragraphs), figure 1, Cited in Finnish Search Report.

Juniper Networks: "Ethernet OAM, A Technical Overview" White Paper, Sep. 2010 [retrieved on Mar. 11, 2013, Retrieved from the Internet: <URL:http://www.webtorials.com/main/resource/papers/juniper/paper1 31Ethernet_OAM.pdf>, pp. 1-17, whole document, Cited in Finnish Search Report.

Finnish Search Report, dated Mar. 7, 2013, from corresponding Finnish application.

* cited by examiner

METHOD AND A SYSTEM FOR FINDING SMALLEST HOP-SPECIFIC DATA TRANSFER SPEED

FIELD OF THE INVENTION

The invention relates to a method and a system for finding the smallest of hop-specific data transfer speeds related to a data transfer path. Furthermore, the invention relates to a data transfer system and to a network element, e.g. a router or a switch, of a data transfer system. Furthermore, the invention relates to a computer program for controlling a network element.

BACKGROUND

A data transfer path from an originator network element to a destination network element may comprise multiple successive hops each being between two network elements located on the above-mentioned data transfer path and interconnected with a data transfer link that can be e.g. a copper wire link, a fiber link, or a radio link. These two network elements can be, for example, Ethernet switches operating on the Open System Interconnection "OSI" Level 2, i.e. on the "L2 data link layer". The originator network element and the destination network element can be, for example, Internet Protocol "IP" routers operating, in addition to the L2 data link layer, on the Open System Interconnection "OSI" Level 3, i.e. on the "L3 network layer". The data transfer speed available on each hop depends on the data transfer speed of the data transfer link being used and/or on other factors such as, for example, a transmitter shaper at the transmission-end of the hop under consideration and/or a receiver shaper at the reception-end of the said hop. Furthermore, one or more of the hops of the data transfer path may have dynamically changing data transfer speed. A hop having dynamically changing data transfer speed can be, for example, a hop implemented with an adaptive microwave "MW" Ethernet radio link whose data transfer speed is adapted according to weather conditions. The data transfer speed of an adaptive microwave Ethernet radio link may vary, for example, from 100 Mbits/sec to 500 Gbits/sec depending on weather conditions. Yet furthermore, buffering capacity available at a transmission-end of an adaptive microwave Ethernet radio link can be quite limited. The above-mentioned viewpoints complicate the control and the management of the end-to-end quality of service "QoS" provided by the data transfer path.

Publication US20120076029 describes a system where maintenance entities may be defined between customer and provider points to allow performance management to take place on an Ethernet network. The maintenance entities may be defined for access links, intra-domain, and inter-domain, and may be defined on a link or service basis. Performance parameters, including availability metrics, may be collected for the maintenance entities. Use of this system for controlling and managing the end-to-end quality of service "QoS" provided by data transfer paths of the kind described above is, however, complicated.

SUMMARY

The following presents a simplified summary in order to provide a basic under-standing of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In conjunction with exemplifying embodiments of the invention, a method for finding the smallest of hop-specific data transfer speeds related to a data transfer path is utilized. The method is based on extending Ethernet Operations, Administration, and Management "OAM" functionality for finding the smallest of the hop-specific data transfer speeds. Background information about Ethernet OAM functionality can be found, for example, from the following technical specifications: IEEE 802.1ag Connectivity Fault Management and ITU-T SG 13 Q5 WG: Y.1731-GAM Functions and Mechanisms for Ethernet Based Networks, where IEEE=Institute of Electrical and Electronics Engineers, and ITU-T SG 13 Q5 WG=International Telecommunication Union, Telecommunication Standardization Sector, Study Group 13, Question 5 Working Group.

The method for finding the smallest of the hop-specific data transfer speeds comprises:
  transmitting, from the first network element to the second network element, first data comprising an Ethernet OAM message,
  updating, in at least one third network element located on the data transfer path, the first data to indicate so far smallest of the hop-specific data transfer speeds,
  in response to reception of the first data at the second network element, transmitting, from the second network element to the first network element, second data indicating the smallest of the hop-specific data transfer speeds, the second data indicating any non-zero value of the smallest of the hop-specific data transfer speeds,
  forming, at least partly based on the second data received at the first network element from the second network element, a first limit value indicating the smallest of the hop-specific data transfer speeds related to the data transfer path and being capable of indicating any non-zero value of the smallest of the hop-specific data transfer speeds, and
  updating a shaper of the first network element to limit peak transmission speed of a data flow transmitted from the first network element to the second network element to be at most the first limit value to control transmission speed of the data flow to be limited based on the first limit value.

With the aid of the above-described method for finding the smallest of hop-specific data transfer speeds, the first network element can be made aware of the smallest of the hop-specific data transfer speeds, and transmission speed of a data flow transmitted from the first network element to the second network element can be limited on the basis of the above-mentioned second data indicating the smallest of the hop-specific data transfer speeds in order to avoid loss of data frames on the data transfer path and thereby to maintain the end-to-end quality of service "QoS".

A method according to an advantageous exemplifying embodiment of the invention comprises transmitting the first data repeatedly from the first network element to the second network element and, as a consequence, transmitting also the responding second data repeatedly from the second network element to the first network element. In this case, the first network element can be kept up-to-date aware of the currently smallest of the hop-specific data transfer speeds. This makes it possible to adapt the transmission speed of a data flow transmitted from the first network element to the second network element according to dynamic changes of one or more of the hop-specific data transfer speeds.

A method according to the invention for controlling a network element includes:
- controlling the network element to transmit first data to a first other network element via a first data transfer path from the network element to the first other network element, the first data comprising an Ethernet Operations, Administration, and Management message,
- forming, at least partly on the basis of second data received from the first other network element, a first limit value indicating smallest of hop-specific data transfer speeds related to the first data transfer path,
- controlling transmission speed of a first data flow transmitted from the network element to the first other network element to be limited on the basis the first limit value,
- controlling the network element to transmit the first data to a second other network element via a second data transfer path from the network element to the second other network element,
- forming, on the basis of other second data received from the second other network element, a second limit value indicating smallest of hop-specific data transfer speeds related to the second data transfer path,
- controlling transmission speed of a second data flow transmitted from the network element to the second other network element to be limited on the basis the second limit value, and
- controlling transmission speed of an aggregate of the first data flow and the second data flow to be limited to be:
  i) at most the first limit value when the first limit value is related to a hop belonging to both of the first and second data transfer paths and the second limit value is equal to or smaller than the first limit value and related to a hop outside the first data transfer path,
  ii) at most the second limit value when the second limit value is related to a hop belonging to both of the first and second data transfer paths and the first limit value is equal to or smaller than the second limit value and related to a hop outside the second data transfer path, and
  iii) at most the first limit value equal to the second limit value when both the first limit value and the second limit value belong to a hop belonging to both of the first data transfer path and the second data transfer path.

In accordance with the invention there is also provided a new network element that comprises a processing system configured to:
- control the network element to transmit first data to a first other network element via a first data transfer path from the network element to the first other network element, the first data comprising an Ethernet OAM message,
- form, on the basis of second data received from the first other network element, a first limit value indicating the smallest of hop-specific data transfer speeds related to the first data transfer path,
- control transmission speed of a first data flow transmitted from the network element to the first other network element to be limited on the basis of the first limit value,
- control the network element to transmit the first data to a second other network element via a second data transfer path from the network element to the second other network element,
- form, on the basis of other second data received from the second other network element, a second limit value indicating smallest of hop-specific data transfer speeds related to the second data transfer path,
- control transmission speed of a second data flow transmitted from the network element to the second other network element to be limited on the basis of the second limit value, and
- control transmission speed of an aggregate of the first data flow and the second data flow to be limited to be:
  i) at most the first limit value when the first limit value is related to a hop belonging to both of the first and second data transfer paths and the second limit value is equal to or smaller than the first limit value and related to a hop outside the first data transfer path,
  ii) at most the second limit value when the second limit value is related to a hop belonging to both of the first and second data transfer paths and the first limit value is equal to or smaller than the second limit value and related to a hop outside the second data transfer path, and
  iii) at most the first limit value equal to the second limit value when both the first limit value and the second limit value belong to a hop belonging to both of the first data transfer path and the second data transfer path.

In accordance with the invention there is provided also a new computer program for controlling a network element. The computer program comprises computer executable instructions for controlling a programmable processor to:
- control the network element to transmit first data to a first other network element via a first data transfer path from the network element to the first other network element, the first data comprising an Ethernet OAM message,
- form, on the basis of second data received from the first other network element, a first limit value indicating the smallest of hop-specific data transfer speeds related to the first data transfer path—control transmission speed of a first data flow transmitted from the network element to the first other network element to be limited on the basis the first limit value,
- control the network element to transmit the first data to a second other network element via a second data transfer path from the network element to the second other network element,
- form, on the basis of other second data received from the second other network element, a second limit value indicating smallest of hop-specific data transfer speeds related to the second data transfer path,
- control transmission speed of a second data flow transmitted from the network element to the second other network element to be limited on the basis the second limit value, and
- control transmission speed of an aggregate of the first data flow and the second data flow to be limited to be:
  i) at most the first limit value when the first limit value is related to a hop belonging to both of the first and second data transfer paths and the second limit value is equal to or smaller than the first limit value and related to a hop outside the first data transfer path,
  ii) at most the second limit value when the second limit value is related to a hop belonging to both of the first and second data transfer paths and the first limit value is equal to or smaller than the second limit value and related to a hop outside the second data transfer path, and
  iii) at most the first limit value equal to the second limit value when both the first limit value and the second limit value belong to a hop belonging to both of the first data transfer path and the second data transfer path.

A computer program product according to the invention comprises a non-volatile computer readable medium, e.g. a compact disc ("CD"), encoded with a computer program according to the invention.

A number of non-limiting exemplifying embodiments of the invention are described in accompanied dependent claims.

Various non-limiting exemplifying embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of unrecited features. The features recited in depending claims are mutually freely combinable unless otherwise explicitly stated.

BRIEF DESCRIPTION OF FIGURES

The exemplifying embodiments of the invention and their advantages are explained in greater detail below in the sense of examples and with reference to the accompanying drawings, in which.

DESCRIPTION OF EXEMPLIFYING EMBODIMENTS

Figure 1:
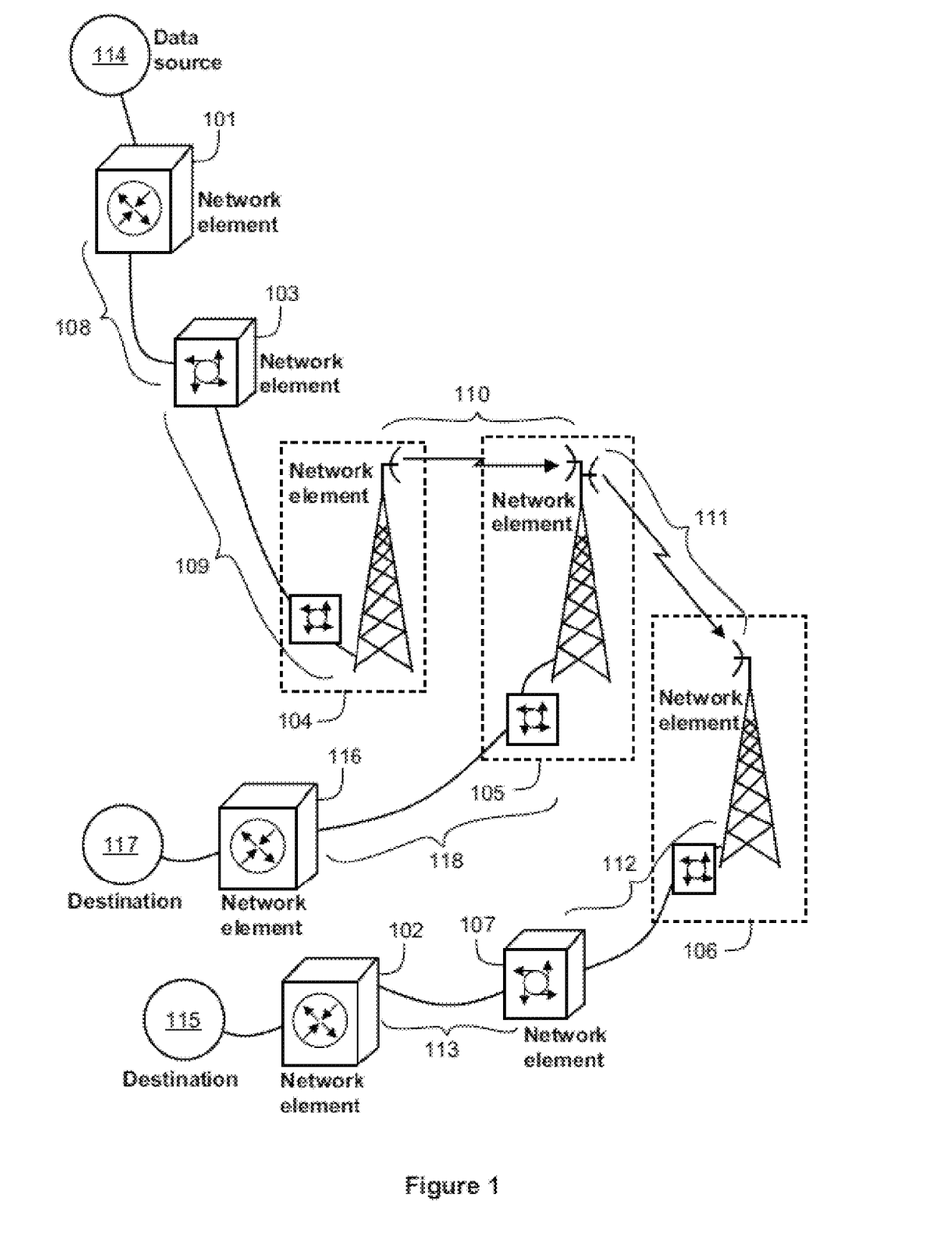
FIG. 1 shows a schematic illustration of an exemplifying data transfer system according to an exemplifying embodiment of the invention.

FIG. 1 shows a schematic illustration of an exemplifying data transfer system that comprises a first network element 101, second network elements 102 and 116, and third network elements 103, 104, 105, 106, and 107. In the exemplifying case shown in FIG. 1, it is assumed that the network elements 103-107 are network elements operating on the Open System Interconnection "OSI" Level 2, i.e. on the "L2 data link layer". These network elements 103-107 can be, for example but not necessarily, Ethernet switches. It is further assumed that the network elements 101, 102, and 116 are operating, in addition to the L2 data link layer, also on the Open System Interconnection "OSI" Level 3, i.e. on the "L3 network layer". These network elements 101, 102, and 116 can be, for example but not necessarily, Internet Protocol "IP" routers. Each of the network elements 101-107, and 116 can be configured to support also other data transfer protocols such as, for example, the MultiProtocol Label Switching "MPLS". The network elements 101-107 and data links between these network elements form a first data transfer path from a data source 114 to a destination 115, and the network elements 101, 103-105, and 116 and data links between these network elements form a second data transfer path from the data source 114 to a destination 117. The data source 114 can be, for example, a storage containing data to be transferred. The destinations 115 and 117 can be, for example, user terminal devices such as personal computers. The first data transfer path from the network element 101 to the network element 102 comprises successive hops 108, 109, 110, 111, 112, and 113 each being between two of the network elements 101-107. The second data transfer path from the network element 101 to the network element 116 comprises successive hops 108, 109, 110, and 118 each being between two of the network elements 101, 103-105, and 116. In the exemplifying case shown in FIG. 1, the network element 104 is connected to the network element 105 with a first radio link, and correspondingly the network element 105 is connected to the network element 106 with a second radio link. The first and second radio links can be, for example, adaptive microwave "MW" Ethernet radio links whose data transfer speeds are adapted according to weather conditions.

The data transfer system shown in FIG. 1 comprises a system according to an exemplifying embodiment of the invention for finding the smallest of the data transfer speeds available on the hops 108-113. The system for finding the smallest of the hop-specific data transfer speeds is implemented in the network elements 101-107 and it is based on extending the Ethernet Operations, Administration, and Management "OAM" functionality. The data transfer system shown in FIG. 1 may further comprise a similar system for finding the smallest of the data transfer speeds available on the hops 108-110, and 118 which belong to the second data transfer path from the network element 101 to the network element 116. Without limiting the generality, we can consider the first data transfer path from the network element 101 to the network element 102. The network 101 element is configured to transmit, to the network element 102, first data comprising an Ethernet OAM message. Each of the network elements 103-107 is configured to update the first data to indicate so far smallest of the hop-specific data transfer speeds when the first data passes through these network elements 103-107. The network element 102 is configured to transmit, in response to reception of the first data, second data to the network element 101, where the second data indicates the smallest of the hop-specific data transfer speeds.

The above-described procedure for delivering to the network element 101 the second data indicating the smallest of the hop-specific data transfer speeds can be implemented in various ways. For example, each of the network elements 103-107 can be configured check whether a speed value contained by the first data is greater than appropriate forwarding speed available at the network element under consideration, and, if yes, overwrite the speed value with the value of the above-mentioned forwarding speed. In this case, the second data may comprise the speed value contained by the first data when the first data was received at the network element 102. For a second example, each of the network elements 103-107 can be configured write, to the first data, a speed value indicating the forwarding speed available at the network element under consideration, and the network element 102 can be configured to select the smallest of the speed values contained by the first data. In this case, the second data may comprise the selected speed value. For a third example, each of the network elements 103-107 can be configured write, to the first data, a speed value indicating the forwarding speed available at the network element under consideration, and the network element 102 can be configured to send the speed values contained by the first data to the network element 101 that is, in turn, configured to select the smallest of the speed values. It is also possible that the first data is updated, in each of the network elements 103-107, not only on the basis of the appropriate forwarding speed available at the network element under consideration but also on the basis of limitations directed to reception speed of data that arrives from the preceding network element on the first data transfer path from the network element 101 to the network element 102. Limitations directed to the reception speed can be caused by, for example, possible ingress shapers.

The network elements 103-107 may have less quality-of-service "QoS" capabilities and buffering capabilities than the network elements 101 and 102. The second data indicating the smallest of the hop-specific data transfer speeds allows controlling or restricting a data flow transferred from the network element 101 to the network element 102 so that use of bandwidth for carrying data traffic which is going to be dropped later on the first data transfer path can be avoided or at least reduced. For example, parameters of a shaper of the network element 101 can be set so that the peak transmission speed, i.e. the peak information rate "PIR", of the data flow from the network element 101 to the network element 102 is limited to be at most the smallest of the hop-specific data transfer speeds related to the first data transfer path.

In a system according to an exemplifying embodiment of the invention for finding the smallest of the hop-specific data transfer speeds, each of the network elements 103-107 is further configured to update the first data to indicate buffer capacity available at a transmission-end related to the so far smallest of the hop-specific data transfer speeds when the first data passes through these network elements 103-107. The network element 102 is configured to include, to the second data, information indicating the buffer capacity available at the transmission-end related to the smallest of the hop-specific data transfer speeds. In this case, the parameters of the shaper of the network element 101 can be set so that the average transmission speed, e.g. the committed information rate "CIR", of the data flow from the network element 101 to the network element 102 is limited to be at most the smallest of the hop-specific data transfer speeds, and a burst size of the data flow is limited to be at most the buffer capacity available at the transmission-end related to the smallest of the hop-specific data transfer speeds. The burst size can be defined to be a difference between amount of data transmitted and amount of data transmittable at the smallest of the hop-specific data transfer speeds within an arbitrary time window.

In a system according to an exemplifying embodiment of the invention for finding the smallest of the hop-specific data transfer speeds, the network element 101 is configured to transmit the first data repeatedly to the network element 102 via the first data transfer path, and correspondingly the network element 102 is configured to transmit the responding second data repeatedly to the network element 101 so as to keep the network element 101 up-to-date aware of the currently smallest of the hop-specific data transfer speeds. This makes it possible to adapt the transmission speed and/or the burst size of the data flow transmitted from the network element 101 to the network element 102 according to dynamic changes of one or more of the data transfer speeds available on the hops 108-113.

The Ethernet OAM message of the first data can be, for example, a Continuity Check Message "CCM" suitable for detecting loss of continuity and incorrect network connections. In this case, each of the network elements 103-107 can be configured to write, to the first data passing through the data transfer path, a speed value indicating the forwarding speed available at the network element under consideration. For another example, the Ethernet OAM message of the first data can be, for example, a Link Trace Message "LTM" suitable for tracking the data transfer path from the network element 101 to other network elements. LTM can be used for probing network topology and link speeds. Information about the network topology can be used for forming shaping configurations which match the network topology. For the sake of illustration, we consider an exemplifying case where the hop 111 has the smallest of the hop-specific data transfer speeds related to the first data transfer path from the network element 101 to the network element 102, and the hop 110 has the smallest of the hop-specific data transfer speeds related to the second data transfer path from the network element 101 to the network element 116. In this exemplifying case, the parameters of the shaper of the network element 101 can be set so that 1) the transmission speed of the aggregate of the data flow from the network element 101 to the network element 102 and the data flow from the network element 101 to the network element 116 is limited to be at most the data transfer speed available on the hop 110, and 2) the transmission speed of the data flow from the network element 101 to the network element 102 is limited to be at most the data transfer speed available on the hop 111. The principle presented above in conjunction with the simple exemplifying topology shown in FIG. 1 where routes of the first and second data transfer paths branch off from each other, can be used for building shaping groups for more complicated topologies.

Figure 2:
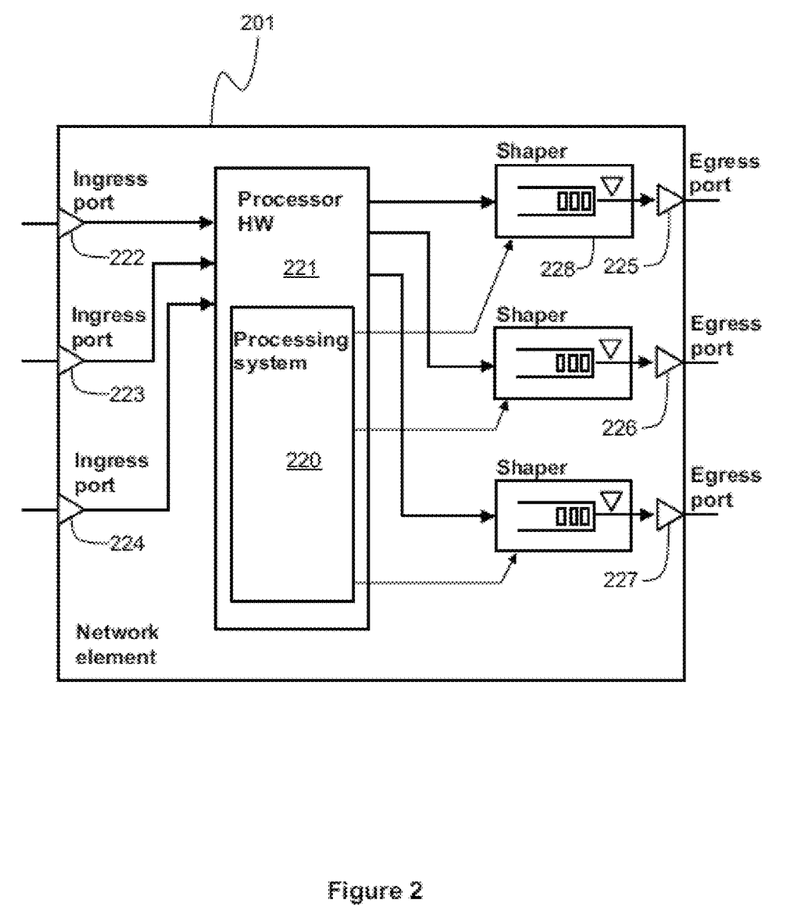
FIG. 2 shows a schematic block diagram of an exemplifying network element according to an exemplifying embodiment of the invention.

FIG. 2 shows a schematic block diagram of an exemplifying network element 201 according to an exemplifying embodiment of the invention. The network element can be, for example, an Internet Protocol "IP" router, an Ethernet switch, and/or a MultiProtocol Label Switching "MPLS" switch. The network element comprises ingress ports 222, 223, and 224, and egress ports 225, 226 and 227 for connecting to other network elements of a data transfer system. The network element comprises a processing system 220 configured to control the network element to transmit first data to a first other network element via a first data transfer path from the network element to the first other network element. The first data comprises an Ethernet Operations, Administration, and Management "OAM" message that can be, for example, a Continuity Check Message "CCM" suitable for detecting loss of continuity and incorrect network connections or a Link Trace Message "LTM" suitable for tracking data transfer paths from the network element to other network elements. The processing system 220 is configured to form, on the basis of second data received from the first other network element, a first limit value indicating the smallest of hop-specific data transfer speeds related to the above-mentioned first data transfer path. The processing system 220 is configured to control transmission speed of a first data flow transmitted from the network element to the first other network element to be limited on the basis the first limit value.

In a network element according to an exemplifying embodiment of the invention, the processing system 220 is configured to control the network element to transmit the first data repeatedly to the first other network element via the first data transfer path, and to update the first limit value on the basis of the second data received repeatedly in response to repeating transmissions of the first data.

In a network element according to an exemplifying embodiment of the invention, the processing system 220 is configured to update a shaper 228 of the network element to limit peak transmission speed of the first data flow from the network element to the first other network element to be at most the first limit value.

In a network element according to an exemplifying embodiment of the invention, the processing system 220 is configured to:
- update the shaper 228 of the network element to limit average transmission speed of the first data flow from the network element to the first other network element to be at most the first limit value,
- form, on the basis of the second data received from the first other network element, a first burst limit value indicating buffer capacity available at a transmission-end related to the smallest of the hop-specific data transfer speeds related to the first data transfer path, and
- update the shaper of the network element to limit burst size of the first data flow to be at most the first burst limit value, the burst size being a difference between amount of transmitted data of the first data flow and amount of data transmittable at the smallest of the hop-specific data transfer speeds related to the first data transfer path within an arbitrary time window.

In a network element according to an exemplifying embodiment of the invention, the processing system 220 is further configured to:
- control the network element to transmit the first data to a second other network element via a second data transfer path from the network element to the second other network element,
- form, on the basis of third data received from the second other network element, a second limit value indicating smallest of hop-specific data transfer speeds related to the above-mentioned second data transfer path, and
- control transmission speed of a second data flow transmitted from the network element to the second other network element to be limited on the basis the second limit value, and
- control transmission speed of an aggregate of the first data flow and the second data flow to be limited on the basis of the first limit value when the first limit value is related to a hop belonging to both of the first and second data transfer paths, and on the basis of the second limit value when the second limit value is related to a hop belonging to both of the first and second data transfer paths.

The processing system 220 shown in FIG. 2 can be implemented with one or more programmable processor circuits, one or more dedicated hardware circuits such as an application specific integrated circuit "ASIC", one or more field programmable logic circuits such as a field programmable gate array "FPGA", or a combination of these. Furthermore, it is also possible that the processing system is implemented with the aid of same processor hardware 221 that is used for performing forwarding- and/or control-plane processes related to data transfer protocols being used, e.g. IP, Ethernet, MPLS.

Figure 3:
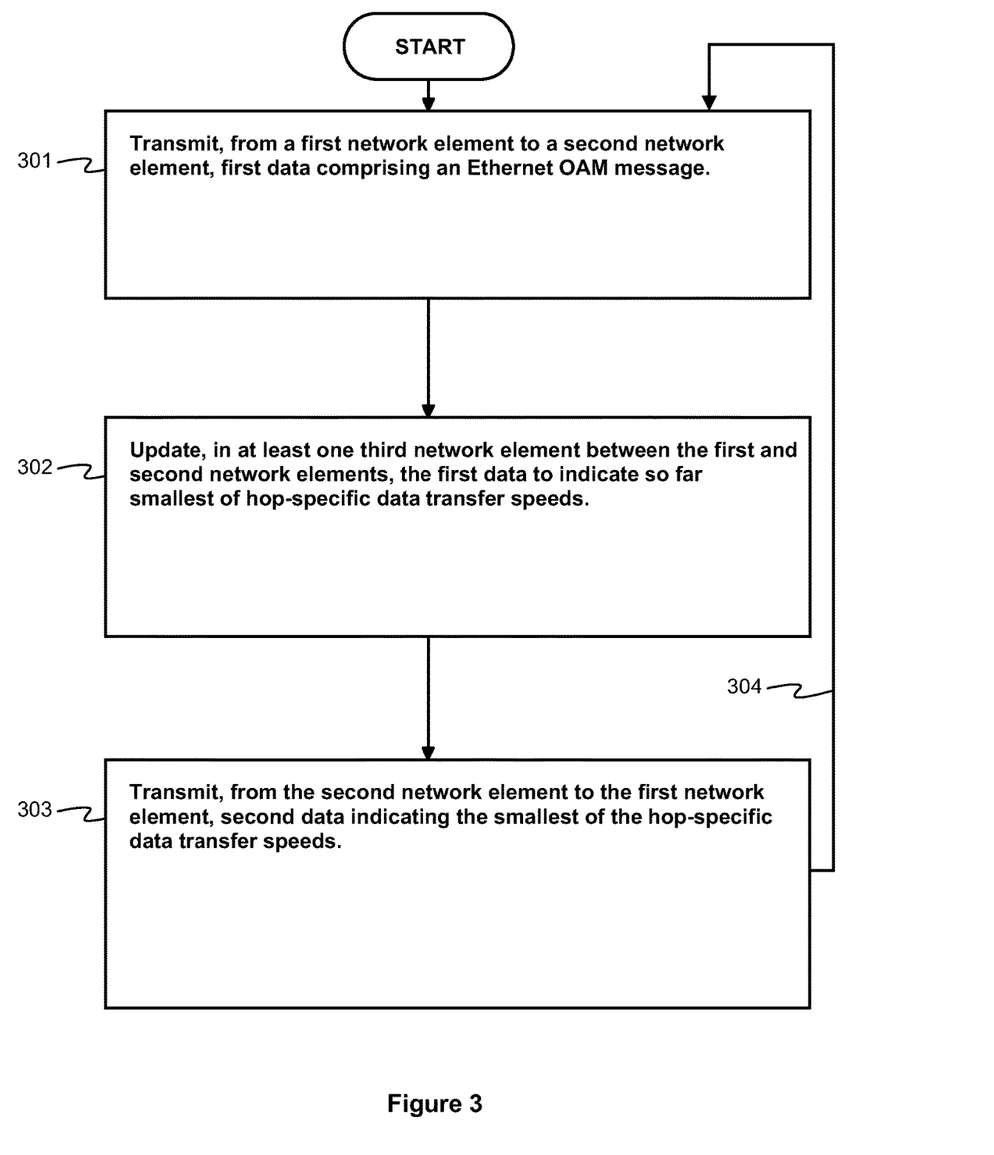
FIG. 3 shows a flow chart of a method according to an exemplifying embodiment of the invention for finding the smallest of hop-specific data transfer speeds of a data transfer path from a first network element to a second network element.

FIG. 3 shows a flow chart of a method according to an exemplifying embodiment of the invention for finding the smallest of hop-specific data transfer speeds of a data transfer path from a first network element to a second network element. The method comprises the following actions:
- action 301: transmitting, from the first network element to the second network element, first data comprising an Ethernet Operations, Administration, and Management "OAM" message,
- action 302: updating, in at least one third network element located on the data transfer path, the first data to indicate so far smallest of the hop-specific data transfer speeds, and
- action 303: in response to reception of the first data at the second network element, transmitting, from the second network element to the first network element, second data indicating the smallest of the hop-specific data transfer speeds.

A method according to an exemplifying embodiment of the invention comprises transmitting the first data repeatedly from the first network element to the second network element, as illustrated by an arrow 304 in FIG. 3.

In a method according to an exemplifying embodiment of the invention, the Ethernet OAM message is a Continuity Check Message "CCM" suitable for detecting loss of continuity and incorrect network connections. In a method according to another exemplifying embodiment of the invention, the Ethernet OAM message is a Link Trace Message "LTM" suitable for tracking the data transfer path from the network element to the other network element.

A method according to an exemplifying embodiment of the invention further comprises:
- updating, in the at least one third network element located on the data transfer path, the first data to indicate buffer capacity available at a transmission-end related to the so far smallest of the hop-specific data transfer speeds, and
- including, to the second data, information indicating the buffer capacity available at the transmission-end related to the smallest of the hop-specific data transfer speeds.

A method according to an exemplifying embodiment of the invention for controlling a network element comprises:
- carrying out a method according to an exemplifying embodiment of the invention for finding the smallest of hop-specific data transfer speeds related to a data transfer path from the network element to another network element, and
- controlling transmission speed of a data flow transferred from the network element to the other network element to be limited on the basis of the smallest of the hop-specific data transfer speeds related to the data transfer path.

The controlling of the transmission speed may comprise, for example, updating a shaper of the network element to limit peak transmission speed of the data flow to be at most the smallest of hop-specific data transfer speeds related to the data transfer path. For another example, the controlling of the transmission speed may comprise:
- updating the shaper of the network element to limit average transmission speed of the data flow to be at most the smallest of the hop-specific data transfer speeds related to the data transfer path, and
- updating the shaper of the network element to limit burst size of the data flow to be at most buffer capacity available at the transmission-end related to the smallest of the hop-specific data transfer speeds related to the data transfer path, the burst size being a difference between amount of transmitted data of the data flow and amount of data transmittable at the smallest of the hop-specific data transfer speeds related to the data transfer path within an arbitrary time window.

A method according to an exemplifying embodiment of the invention for controlling a network element comprises:
- carrying out a method according to an exemplifying embodiment of the invention for finding the smallest of hop-specific data transfer speeds related to a first data transfer path from the network element to a first other network element, controlling transmission speed of a first data flow transferred from the network element to the first other network element to be limited on the basis of the smallest of the hop-specific data transfer speeds related to the first data transfer path, carrying out a method according to an exemplifying embodiment of the invention for finding smallest of hop-specific data transfer speeds related to a second data transfer path from the network element to a second other network element, controlling transmission speed of a second data flow transferred from the network element to the second other network element to be limited on the basis of the smallest of the hop-specific data transfer speeds related to the second data transfer path, and controlling transmission speed of an aggregate of the first data flow and the second data flow to be limited on the basis of the smallest of the hop-specific data transfer speeds related to the first data transfer path when a hop having the smallest of the hop-specific data transfer speeds related to the first data transfer path belongs also to the second data transfer path, and on the basis of the smallest of the hop-specific data transfer speeds related to the second data transfer path when a hop having the smallest of the hop-specific data transfer speeds related to the second data transfer path belongs also to the first data transfer path.

A computer program according to an exemplifying embodiment of the invention for controlling a network element comprises computer executable instructions for controlling a programmable processor to carry out a method according to any of the above-described exemplifying embodiments of the invention for controlling a network element.

A computer program according to an exemplifying embodiment of the invention comprises software modules for controlling a programmable processor to control a network element. The software modules comprise computer executable instructions for controlling the programmable processor to:

control the network element to transmit first data to another network element via a data transfer path from the network element to the other network element, the first data comprising an Ethernet Operations, Administration, and Management message, form, on the basis of second data received from the other network element, a first limit value indicating smallest of hop-specific data transfer speeds related to the data transfer path, and control transmission speed of a data flow transmitted from the network element to the other network element to be limited on the basis the first limit value.

The software modules can be, for example, subroutines and functions generated with a suitable programming language.

A computer program product according to an exemplifying embodiment of the invention comprises a non-volatile computer readable medium, e.g. a compact disc ("CD"), encoded with the above-mentioned software modules.

A signal according to an exemplifying embodiment of the invention is encoded to carry information defining a computer program according to an embodiment of the invention.

The specific examples provided in the description given above should not be construed as limiting the applicability and/or the interpretation of the appended claims.

What is claimed is:

1. A network element comprising:
a processing system configured to:
control the network element to transmit first data to a first other network element via a first data transfer path from the network element to the first other network element, the first data comprising an Ethernet Operations, Administration, and Management message,
form, at least partly on the basis of second data received from the first other network element, a first limit value indicating a smallest data transfer speed of hop-specific data transfer speeds related to the first data transfer path,
control a transmission speed of a first data flow transmitted from the network element to the first other network element to be limited on the basis of the first limit value,
control the network element to transmit the first data to a second other network element via a second data transfer path from the network element to the second other network element,
form, on the basis of other second data received from the second other network element, a second limit value indicating smallest of hop-specific data transfer speeds related to the second data transfer path;
control transmission speed of a second data flow transmitted from the network element to the second other network element to be limited on the basis of the second limit value; and
control a transmission speed of an aggregate of the first data flow and the second data flow to be limited to be:
i) at most the first limit value when the first limit value is related to a hop belonging to both of the first and second data transfer paths and the second limit value is equal to or smaller than the first limit value and related to a hop outside the first data transfer path,
ii) at most the second limit value when the second limit value is related to a hop belonging to both of the first and second data transfer paths and the first limit value is equal to or smaller than the second limit value and related to a hop outside the second data transfer path, and
iii) at most the first limit value equal to the second limit value when both the first limit value and the second limit value belong to a hop belonging to both of the first data transfer path and the second data transfer path,
wherein the Ethernet Operations, Administration, and Management message represents a request for the second data.

2. The network element according to claim 1, wherein the processing system is configured to control the network element to transmit the first data repeatedly to the first other network element via the first data transfer path.

3. The network element according to claim 1, wherein the Ethernet Operations, Administration, and Management message is a Continuity Check Message suitable for detecting loss of continuity and incorrect network connections.

4. The network element according to claim 1, wherein the Ethernet Operations, Administration, and Management message is a Link Trace Message suitable for tracking the data transfer path from the network element to the other network element.

5. The network element according to claim 1, wherein the processing system is configured to:

update a shaper of the network element to limit an average transmission speed of the first data flow to be at most the first limit value, form, based on the second data, a burst limit value indicating a buffer capacity available at a transmission-end related to the smallest data transfer speed of the hop-specific data transfer speeds related to the first data transfer path, and update the shaper of the network element to limit a burst size of the first data flow to be at most the burst limit value, the burst size being a difference between an amount of data of the first data flow transmitted within an arbitrary time window and an amount of data transmittable at a speed corresponding to the first limit value within the arbitrary time window.

6. The network element according to claim 1, wherein the network element is at least one of the following: an Internet Protocol ("IP") router, an Ethernet switch, a Multi Protocol Label Switching ("MPLS") switch.

7. A method for controlling a network element, the method comprising:

controlling the network element to transmit first data to a first other network element via a first data transfer path from the network element to the first other network element, the first data comprising an Ethernet Operations, Administration, and Management message;

forming, at least partly on the basis of second data received from the first other network element, a first limit value indicating a smallest of hop-specific data transfer speeds related to the first data transfer path;

controlling a transmission speed of a first data flow transmitted from the network element to the first other network element to be limited on the basis the first limit value;

controlling the network element to transmit the first data to a second other network element via a second data transfer path from the network element to the second other network element;

forming, on the basis of other second data received from the second other network element, a second limit value indicating smallest of hop-specific data transfer speeds related to the second data transfer path, controlling transmission speed of a second data flow transmitted from the network element to the second other network element to be limited on the basis of the second limit value; and controlling transmission speed of an aggregate of the first data flow and the second data flow to be limited to be:

i) at most the first limit value when the first limit value is related to a hop belonging to both of the first and second data transfer paths and the second limit value is equal to or smaller than the first limit value and related to a hop outside the first data transfer path, ii) at most the second limit value when the second limit value is related to a hop belonging to both of the first and second data transfer paths and the first limit value is equal to or smaller than the second limit value and related to a hop outside the second data transfer path, and iii) at most the first limit value equal to the second limit value when both the first limit value and the second limit value belong to a hop belonging to both of the first data transfer path and the second data transfer path, wherein the Ethernet Operations, Administration, and Management message represents a request for the second data.

8. The method according to claim 7, further comprising:

updating in the at least one third network element located on the data transfer path, the first data to indicate a buffer capacity available at a transmission-end related to the current smallest data transfer speed of the hop-specific data transfer speeds;

associating, with the second data, information indicating the buffer capacity available at the transmission-end related to the smallest data transfer speed of the hop-specific data transfer speeds;

updating a shaper of the network element to limit an average transmission speed of the first data flow to be at most the smallest data transfer speed of the hop-specific data transfer speeds related to a first data transfer path; and updating the shaper of the network element to limit a burst size of the first data flow to be at most the buffer capacity available at the transmission-end related to the smallest data transfer speed of the hop-specific data transfer speeds related to the first data path, the burst size being a difference between an amount of data of the first data flow transmitted within an arbitrary time window and an amount of data transmittable at the smallest data transfer speed of the hop-specific data transfer speeds related to a first data transfer path within the arbitrary time window.

9. A non-transitory computer readable medium encoded with a computer program for controlling a network element, the computer program comprising computer executable instructions for controlling a programmable processor to:

control the network element to transmit first data to a first other network element via a first data transfer path from the network element to the first other network element, the first data comprising an Ethernet Operations, Administration, and Management message;

form, on the basis of second data received from the first other network element, a first limit value indicating a smallest data transfer speed of hop-specific data transfer speeds related to the first data transfer path;

control a transmission speed of a first data flow transmitted from the network element to the first other network element to be limited on the basis of the first limit value, control the network element to transmit the first data to a second other network element via a second data transfer path from the network element to the second other network element;

form, on the basis of other second data received from the second other network element, a second limit value indicating smallest of hop-specific data transfer speeds related to the second data transfer path, control transmission speed of a second data flow transmitted from the network element to the second other network element to be limited on the basis of the second limit value, and control transmission speed of an aggregate of the first data flow and the second data flow to be limited to be:

i) at most the first limit value when the first limit value is related to a hop belonging to both of the first and second data transfer paths and the second limit value is equal to or smaller than the first limit value and related to a hop outside the first data transfer path, ii) at most the second limit value when the second limit value is related to a hop belonging to both of the first and second data transfer paths and the first limit value is equal to or smaller than the second limit value and related to a hop outside the second data transfer path, and iii) at most the first limit value equal to the second limit value when both the first limit value and the second limit value belong to a hop belonging to both of the first data transfer path and the second data transfer path, wherein the Ethernet Operations, Administration, and Management message represents a request for the second data.

* * * * *